United States Patent
Luke et al.

(10) Patent No.: US 11,412,106 B1
(45) Date of Patent: Aug. 9, 2022

(54) ADJUSTING COLORS BASED ON SUPPLY LEVELS OF PRINT SUPPLIES

(71) Applicant: HEWLETT-PACKARD DEVELOPMENT COMPANY, L.P., Spring, TX (US)

(72) Inventors: Jeffrey H. Luke, Boise, ID (US); Scott K. Hymas, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/330,271

(22) Filed: May 25, 2021

(51) Int. Cl.
*H04N 1/60* (2006.01)
*G03G 15/08* (2006.01)
*G06F 3/12* (2006.01)
*B41J 2/175* (2006.01)

(52) U.S. Cl.
CPC ........ *H04N 1/6002* (2013.01); *B41J 2/17566* (2013.01); *G03G 15/0856* (2013.01); *G06F 3/1237* (2013.01)

(58) Field of Classification Search
CPC .......................... H04N 1/6002; B41J 2/17566
See application file for complete search history.

(56) References Cited

U.S. PATENT DOCUMENTS

| | | | | |
|---|---|---|---|---|
| 2002/0135800 A1* | 9/2002 | Dutta | ................... | G06F 3/1219 358/1.15 |
| 2004/0066525 A1* | 4/2004 | Zerza | ................... | G06F 3/1232 358/1.14 |
| 2004/0196331 A1* | 10/2004 | Zerza | ........................ | B41J 2/21 347/43 |
| 2005/0105136 A1* | 5/2005 | Jung | .................... | H04N 1/6022 358/3.1 |
| 2006/0158673 A1* | 7/2006 | Gondek | ............... | G06K 15/102 358/1.13 |
| 2007/0039504 A1* | 2/2007 | Edwards | ............... | B41J 2/17566 101/484 |
| 2008/0111842 A1* | 5/2008 | Hall | ..................... | B41J 2/17566 347/7 |
| 2009/0046115 A1* | 2/2009 | Seacat | .................. | G06K 15/102 347/3 |

* cited by examiner

*Primary Examiner* — Ted W Barnes
(74) *Attorney, Agent, or Firm* — Dicke Billig & Czaja PLLC

(57) ABSTRACT

An example method comprises identifying a plurality of supply levels corresponding to a plurality of print supplies of a print device, and adjusting a color for a region of a print job for the print device based on the plurality of supply levels. The method further comprises initiating execution of the print job using the adjusted color for the region.

20 Claims, 6 Drawing Sheets

ADJUSTING COLORS BASED ON SUPPLY LEVELS OF PRINT SUPPLIES

BACKGROUND

Various types of devices include replaceable print supplies, such as inkjet printhead assemblies, and print material containers for two-dimensional (2D) or three-dimensional (3D) print devices. Example print material containers include inkjet cartridges, toner cartridges, ink and toner supplies, and build material supplies, among others. In some instances, print devices may have a plurality of print supplies used to print in black and/or in color.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Documents may be used to disseminate information and may include printed forms. A printed document may be produced by a print device based on data received from a computing device. Various types of print devices use replaceable print supplies to produce printed documents, such as 2D and 3D print devices. The print device may form markings using marking material, such as using liquid print fluids or powdered toner, on the print media based on the data received. Example 2D and 3D print devices include inkjet printers, dry toner printers, liquid toner printers, and 3D powder bed inkjet printers. Example print supplies include any number of print material containers, such as ink tanks, ink bottles, inkjet printhead cartridges, dry toner reservoirs, liquid toner reservoirs, dry toner cartridges, and build material supplies. Other example print devices include fluidic dispensing devices used to eject material onto a medium or onto a layer of powdered-based build material.

Many print devices include print supplies comprising both black print supply and non-black print supply, and which may be consumed while printing in black and in color. The print supplies may deplete at different rates, resulting in multiple replacement processes.

Examples of the present disclosure are directed to adjusting a color for a region of a print job based on supply levels of a plurality of print supplies installed within the print device. The color for the region may be adjusted from an original color to coordinate depletion of the plurality of print supplies, such as by dynamically changing colors to use more or less of the print supplies. For example, a mixture of the plurality of print supplies to use for the region may be shifted to reduce use of a print supply which is identified as having or predicted to have a higher consumption rate than the remaining print supplies. By coordinating depletion of the plurality of print supplies, multiple print supplies may be replaced in a replacement order and/or at the same time, which may reduce shipping and/or service costs while minimizing supply or package waste.

Figure 1:
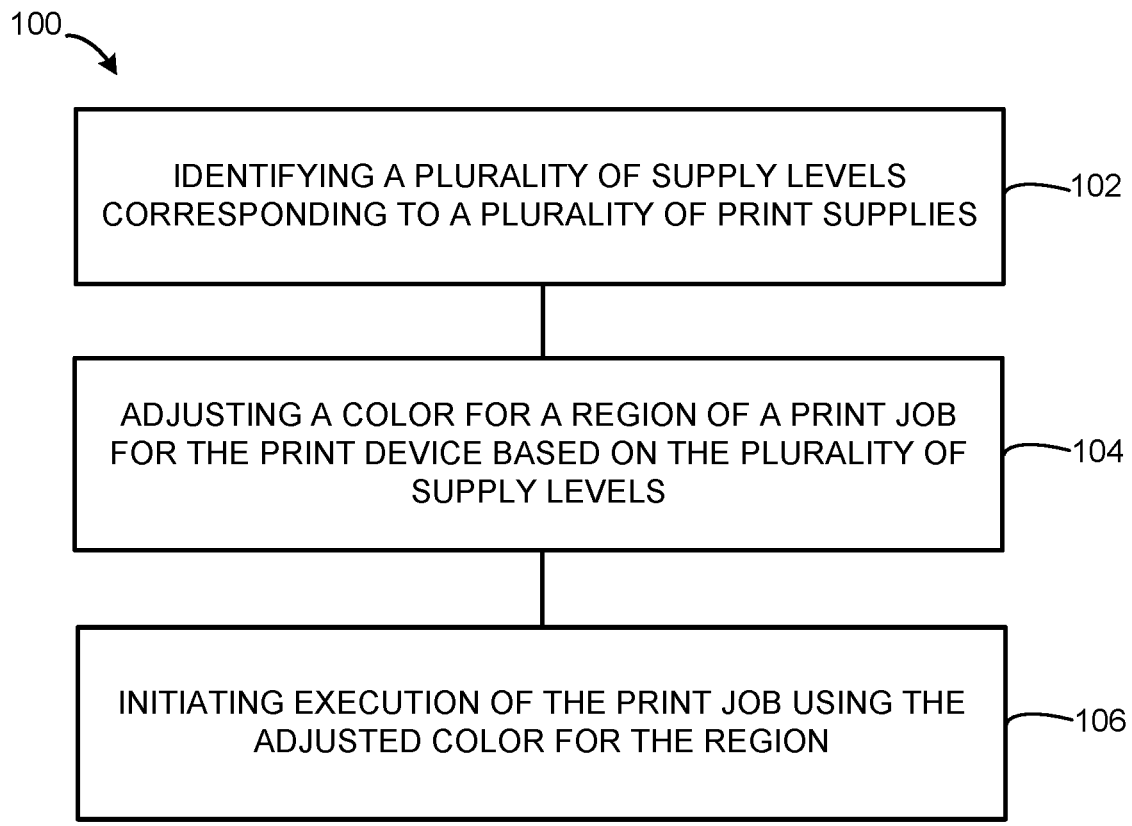
FIG. 1 illustrates an example method for adjusting a color for a region of a print job based on a plurality of supply levels, in accordance with examples of the present disclosure.

Turning now to the figures, FIG. 1 illustrates an example method for adjusting a color for a region of a print job based on a plurality of supply levels, in accordance with examples of the present disclosure.

At 102, the method 100 includes identifying a plurality of supply levels corresponding to a plurality of print supplies of a print device. The print supplies may include ink or toner which are in print material containers. In some examples, the plurality of print supplies include a black print supply and a plurality of non-black print supplies. The plurality of non-black print supplies may be separate from one another, such that each of the non-black print supplies are in a separate print material container. In some examples, the plurality of non-black print supplies may be in a single print material container, such as a 3-in-1 color ink or toner cartridge. In some examples, the plurality of print supplies are colorants including cyan (C), magenta (M), yellow (Y), and black (K) print supplies, which is sometimes herein referred to as CMYK.

Each print supply may have an associated supply level, which indicates an amount of print supply that is depleted and/or that remains. As used herein, a supply level refers to or includes an estimated or measured remaining amount of marking material (e.g., ink or toner) of a print supply. The print device executes print jobs by printing out documents using the plurality of print supplies. The supply levels may be identified by the print device based on a page count that estimates an average number of pages per supply and/or using sensors to detect the supply levels.

The plurality of print supplies may be used by the print device to execute different types of print jobs. For example, the print device may be designed to print in black and in color. Due to the different types of print jobs and print supplies used to perform the printing, the plurality of print supplies may be used at different rates, which is generally referred to as a "consumption rate". Variances in consumption rates for respective print supplies of the plurality may cause the print supplies to be depleted at different times. With a print material container having multiple print supplies, depletion of one of the print supplies may result in unused or wasted print supply in other reservoirs.

At 104, the method 100 includes adjusting a color for a region of a print job for the print device based on the plurality of supply levels. The color for the region may be adjusted to balance consumption rates of the plurality of print devices. Adjusting the color for the region may include shifting a mixture of the plurality of print supplies to use for the region to generate the adjusted color. The shifting of the mixture may reduce use of a first subset of the plurality of print supplies and increase use of a second subset of the plurality of print supplies as compared to printing an original color for the region of the print job. Each of the first subset and second subset may include a print supply and/or multiple print supplies. As a specific example, the adjusted color may use less of C print supply and more of K print supply as compared to the original color for the region. In another example, the adjusted color may use less of K and C print supplies, and more of M and Y print supplies, among other variations.

In some examples, the method 100 may include identifying consumption rates of the plurality of print supplies based on the plurality of supply levels and adjusting the color for the region by shifting the mixture of the plurality of print supplies to use for the region to reduce use of a print supply of the plurality of print supplies based on the consumption rates. As further described herein, the color adjustment may be based on set color adjustment options for the original color and associated percentages of each colorant to use to obtain the adjusted color, sometimes referred to herein as a "color adjustment mixture."

The method 100 may include classifying the region of the print job and adjusting the color for the region based on the classification. The region may be classified by manual labelling or tagging and/or using a data model. In various examples, the print job includes a plurality of regions and the plurality of regions are classified, where the plurality of regions includes the region. The regions may be classified as adjustable regions and/or nonadjustable regions. For example, a subset of the plurality of regions may be classified as adjustable regions. In some examples, the remaining regions of the plurality of regions may be classified as nonadjustable regions. As used herein, an adjustable region refers to or includes a region of a print job which may have a color adjusted from an original color. A nonadjustable region refers to or includes a region of print job which is matched to or replicated as an original color.

In some examples, the color is adjusted for the region based on a set of rules. The color may be automatically set based on the set of rules. The set of rules may be associated with classifications of regions to adjust an original color and to match or replicate the original color, variances in consumption rates of the plurality of print supplies, color adjustment options, and color adjustment mixtures. As described above, the classifications may include adjustable regions and non-adjustable regions. Other classifications include and/or may be associated with the objects in the region, such as humans, animals, nature, charts, accents, cars and/or other particular objects. Variances in consumption rates may be predicted and/or observed based on supply levels and/or pattern(s) of usage, as further described herein. The color adjustment options may include identified adjustments to original colors including a mixture of the plurality of print supplies to use to achieve the adjusted color, sometimes herein referred to as "color adjustment mixtures". For example, the adjusted color may be achieved using a shift in a percentage of a subset and/or all of the plurality of print supplies, such as increasing and/or decreasing a percentage of print supply to use.

In some examples, the method 100 includes applying a data model to input data to classify the region and adjust the color for the region. The regions may be automatically classified and the color may be automatically set based on the data model. The input data may include the plurality of supply levels and/or consumption rates of the plurality of print supplies, patterns of usage of the print supplies, the print job, an object classification dataset, color adjustment options and/or color adjustment mixtures, and a combination thereof. The patterns of usage may include trends of consumption rates of print supplies for the print device and/or a user, predicted consumption rates of print supplies for the print device, and/or general trends of consumption rates for a plurality of print devices.

In some examples, the data model may include an artificial intelligence (AI) model or machine learning model (MLM). Various ML frameworks are available from multiple providers which provide open-source ML datasets and tools to enable developers to design, train, validate, and deploy MLMs, such as AI/ML processors. AI/ML processors (also sometimes referred to as hardware accelerators (MLAs), or Neural Processing Units (NPUs)) may accelerate processing of MLMs. ML processors are integrated circuits (ASICs) that may have multi-core designs and employ precision processing with optimized dataflow architectures and memory use to accelerate calculation and increase computational throughput when processing MLMs.

MLMs are stored as model files having a representational data format which describes the architecture of the model (e.g., input, output, and hidden layers, layer weights, nodes of each layer, interconnections between nodes of different layers, and ML operations of each node/layer) along with operating parameters and, thus, describe or represent a process flow between input and output layers of an MLM. After development, the MLM may be deployed in environments other than the environment or framework in which the model was initially trained. For example, distributing computing devices of a cloud system may train the MLM and distribute the trained MLM to local computing devices and/or printer devices to implement.

In some examples, the data model applied to the input data includes the MLM and the method 100 may include classifying a plurality of regions of the print job by defining a plurality of objects in the print job using the data model. The method may further include determining to adjust the color of the region based on the classifications and a set of rules, such as the set of rules described above. In response to the determination, the method 100 includes adjusting the color for the region based on the set of rules. For example, the data model may be used to analyze print jobs and objects of print jobs to determine whether to color match or color adjust the original color of regions of the print jobs, and analyze an amount of colorant in supply and consumption rates to adjust colors to conserve and/or synchronize out the print supplies.

In some examples, the plurality of objects in the print job may be defined using ML, such as object detection and categorization. The objects in the print job may be defined by detecting the objects using a dataset and the MLM, such as identifying a location of object(s) and classifying an image or the object(s) using a Common Objects in Context (COCO) dataset and a Fast Region-Convolution Neural Network (R-CNN) and/or Mask R-CNN. Other examples include use of COCO, Scene Understanding (SUN), ImageNet Large Scale Visual Recognition Competition (ILSVRC), Pattern Analysis Statistical Modelling and Computational Learning (PASCAL) Visual Object Classes (VOC) datasets and/or combinations thereof. Example MLMs include CNN, Faster R-CNN, You Only Look Once (YOLO), Single Shot Detector (SSD), Mask R-CNN, DeepLab, and/or Pyramid Scene Parsing Network (PSPNet). However, examples are not so limited, and examples may include other types of categorizations.

In various examples, the data model may be updated over time. For example, the data model may be updated based on feedback provided. Example feedback includes updated input data and/or updates to the structure of the data model itself. As an example, the data model may be updated based on a feedback pattern of usage of the plurality of print supplies for the print device and/or a user, and/or patterns of usage of print supplies of a plurality of print devices. For example, a print device or set of print devices may exhibit a particular pattern of usage of the plurality of print supplies, such as a higher consumption rate of Y print supply as compared to CM print supplies. In other examples, a general pattern may be observed as being common to many print devices, such as a higher consumption rate of C print supply as compared to YM print supplies. In some examples, particular users, organizations, industries, and/or geographies may exhibit specific patterns of usage. Other feedback may include changes to a service agreement, information to categorize print jobs, changes in shipping and/or service parameters, and changes in types of print supply, among others.

At 106, the method 100 includes initiating execution of the print job using the adjusted color for the region. As described above, the color may be adjusted from an original color in the print job. As used herein, a print job includes or refers to a file or set of files to be submitted to a print device, such as a data object that represents a document to be printed. A user may request a print job using a computing device, and the print job is communicated to the print device directly by the computing device or through another local or remote computing device, such as a local or remote server. The user may include an individual customer or a user of an organization which is the customer. In some examples, the method 100 may further include executing the print job by the print device.

In some examples, adjusting the color for the region may be used to coordinate depletion of the print supplies. Coordinating depletion of the plurality of print supplies may reduce variances in the supply lifetimes of the print supplies, and in some examples, may eliminate or prevent variances in the supply lifetimes of the print supplies such that multiple print supplies of the plurality are depleted at the same time or within a threshold amount of time. With a print material container having multiple print supplies, coordinating depletion of the print supplies may result in reduced waste of print supply.

In some examples, users of print devices may print documents within a contractual print system. For example, the system may include print devices and/or print supplies which are provided to the customer by a service provider, and the service provider may maintain the print devices, such as replacing parts and/or reordering the print supplies. The system may be based on service plans that identify a number of pages printed per billing cycle and/or a pre-paid amount of pages. The service provider may manage billing for providing the service, order replacement print supplies and/or perform maintenance on the print device. In other examples, the service provider may provide a management print service, as further described below.

The service agreement may have associated terms, such as print costs and guaranteed print qualities. The service agreement may define a cost per page that differs depending on the print job type (e.g., in black, in color, print quality), or may define a cost per page regardless of the print job type. The print service provider may track the consumption of the plurality of print supplies and is responsible for providing replacement print supplies. As another example, a customer may contract with a managed print service provider that is responsible for managing the health of the print device, including replacing print supplies. The managed print service provider may send an employee to the location of the print device to replace the print supplies. A managed print service, as used herein, refers to or includes locally managing the print device, such as a local visit by an employee of the service provider to a location of the print device to manage the health of the print device (e.g., replacing parts, replacing print supplies, and/or otherwise physically working on the print device). A print service refers to or includes remotely managing the print device, which is sometimes herein referred to as a "remote print service".

In some examples, the print system may be cloud-based, which may be referred to as a "cloud-based print system", and may provide a plurality of services, such a subscription services. A subscription service may include a service provided on a contractual basis for a period of time and for an agreed to amount. Example subscription services include a print supply replacement service and/or a service for a predefined number of printed pages.

A print supply replacement service may include providing automatic replacement of the plurality of print supplies of the print device, which may be ordered and replaced or refilled by the service provider. In some examples, when the print device identifies a print supply has reached a threshold level, the print device may communicate with the service provider, either directly or through a local computing device, and the service provider may automatically initiate a replacement order of the print supply or schedule an employee to visit. With a print supply replacement service, the customer pays the subscription fee and the service provider is responsible for providing print supplies as necessary.

In some examples, the method 100 includes initiating a replacement order corresponding to multiple print supplies at the same time. The replacement order may include two print supplies, three print supplies, or all of the plurality of print supplies, such as a subset or all of the CMYK print supplies. By coordinating depletion and replacement of print supplies, a service provider may reduce shipping or other service costs by the simultaneous replacement. And, there may be fewer disruptions to use of the print device due to the simultaneous replacement and/or increased supply lifetime.

In various examples, the method 100 may be implemented by the print device. A print device, as used herein, includes or refers to a device that makes a representation of text or graphics on physical media. In some examples, the method 100 may be implemented by a computing device local to the print device, such as a local computer or a local server in communication with the print device. In some examples, the method 100 may be implemented by a computing device remotely located from the print device, such as a distributed processor that may be a part of a cloud computing system and used to implement a print service or a managed print service. In further examples, the method 100 may be implemented using a combination of the print device, the computing device local to the print device and/or the remote computing device.

Figure 2:
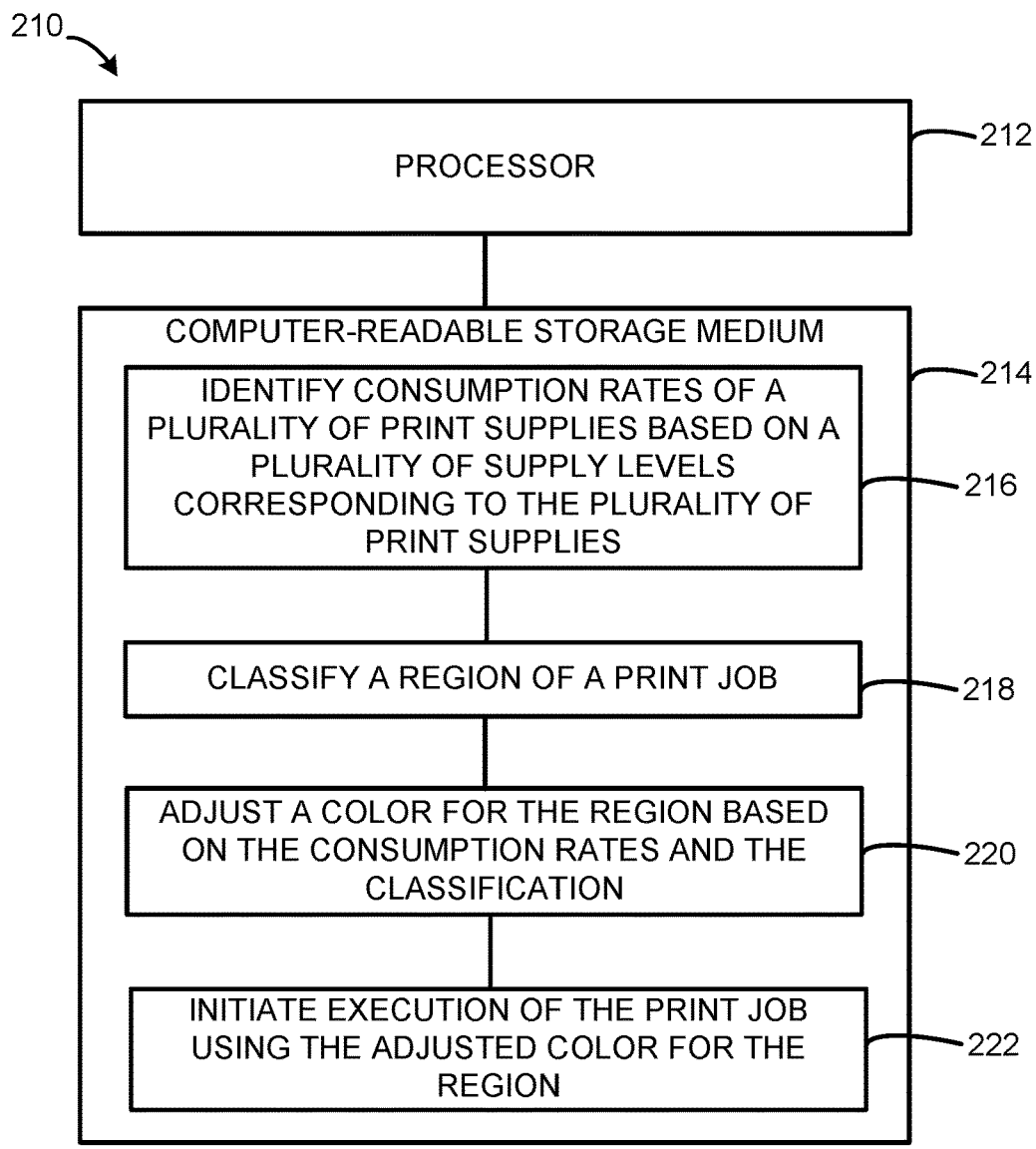
FIG. 2 illustrates an example device including non-transitory computer-readable storage medium, in accordance with examples of the present disclosure.

FIG. 2 illustrates an example device including non-transitory computer-readable storage medium, in accordance with examples of the present disclosure. The device 210 includes a processor 212 and memory. The memory may include a computer-readable storage medium 214 storing a set of instructions 216, 218, 220, and 222.

The computer-readable storage medium 214 may include Read-Only Memory (ROM), Random-Access Memory (RAM), Electrically Erasable Programmable Read-Only Memory (EEPROM), flash memory, a solid state drive, Electrically Programmable Read Only Memory aka write once memory (EPROM), physical fuses and e-fuses, and/or discrete data register sets. In some examples, computer-readable storage medium 214 may be a non-transitory storage medium, where the term "non-transitory" does not encompass transitory propagating signals.

At 216, the processor 212 may identify consumption rates of a plurality of print supplies of a print device based on a plurality of supply levels corresponding to the plurality of print supplies. At 218, the processor 212 may classify a region of a plurality of regions of a print job. At 220, the processor 212 may adjust a color for the region based on the consumption rates and the classification. At 222, the processor 212 may initiate execution of the print job using the adjusted color for the region. As previously described, the classification may be based on tagging or labelling of the regions and/or a data model. In some examples, the processor 212 may classify the plurality of regions and adjust the color for the region based on the data model and input data, such as the input data described above. For example, the processor 212 may classify the plurality of regions based on a plurality of defined objects in the print job and the data model, as previously described.

In some examples, the processor 212 may adjust the color for the region based on a set of rules to coordinate depletion of the plurality of print supplies. The set of rules may be associated with classifications of the plurality of regions to adjust and color adjustment options.

In various examples, the processor 212 and computer-readable storage medium 214 may form part of the print device, part of a remotely-located computing device, or part of a computing device that is local to the print device, such as a local server or computer and sometimes herein referred to as "a local computing device". In some examples, the device 210 forms part of a cloud computing system having a plurality of remotely-located and/or distributed computing devices. For example, although FIG. 2 illustrates a single processor 212 and a single computer-readable storage medium 214, examples are not so limited and may be directed to devices and/or systems with multiple processors and multiple computer-readable storage mediums. The instructions may be distributed and stored across the multiple computer-readable storage mediums and may be distributed and executed by the multiple processors.

In some examples, the processor 212 may aggregate data associated with patterns of usage of print supplies of a plurality of print devices. For example, the processor 212 may aggregate the data, and provide analytics on the usage of print supplies. The data analytics may be used to track patterns of usage of print supplies and predict depletion or consumption rates of print supplies based on the tracked patterns of usage of the particular print device and/or a plurality of print devices. As an example, a particular organization may use a color faster than other organizations, such as an organization with a particular color logo. As another example, a particular industry may exhibit particular patterns of usage of print supplies. In some examples, the pattern of usage may be specific to a user. The patterns of usage of print supplies may be used to supplement current supply levels of the plurality of print supplies and to adjust a color of a region.

Although FIGS. 1-2 describe the classification of a region and adjustment of a color of the region, examples are not so limited. In various examples, a plurality of regions are classified, and colors for the plurality of regions are adjusted from original colors in the print job. In some examples, a plurality of regions are classified, and colors for a first subset of the plurality of regions are adjusted from original colors in the print job and colors are matched to the original color for remaining regions based on the classifications.

Figure 3:
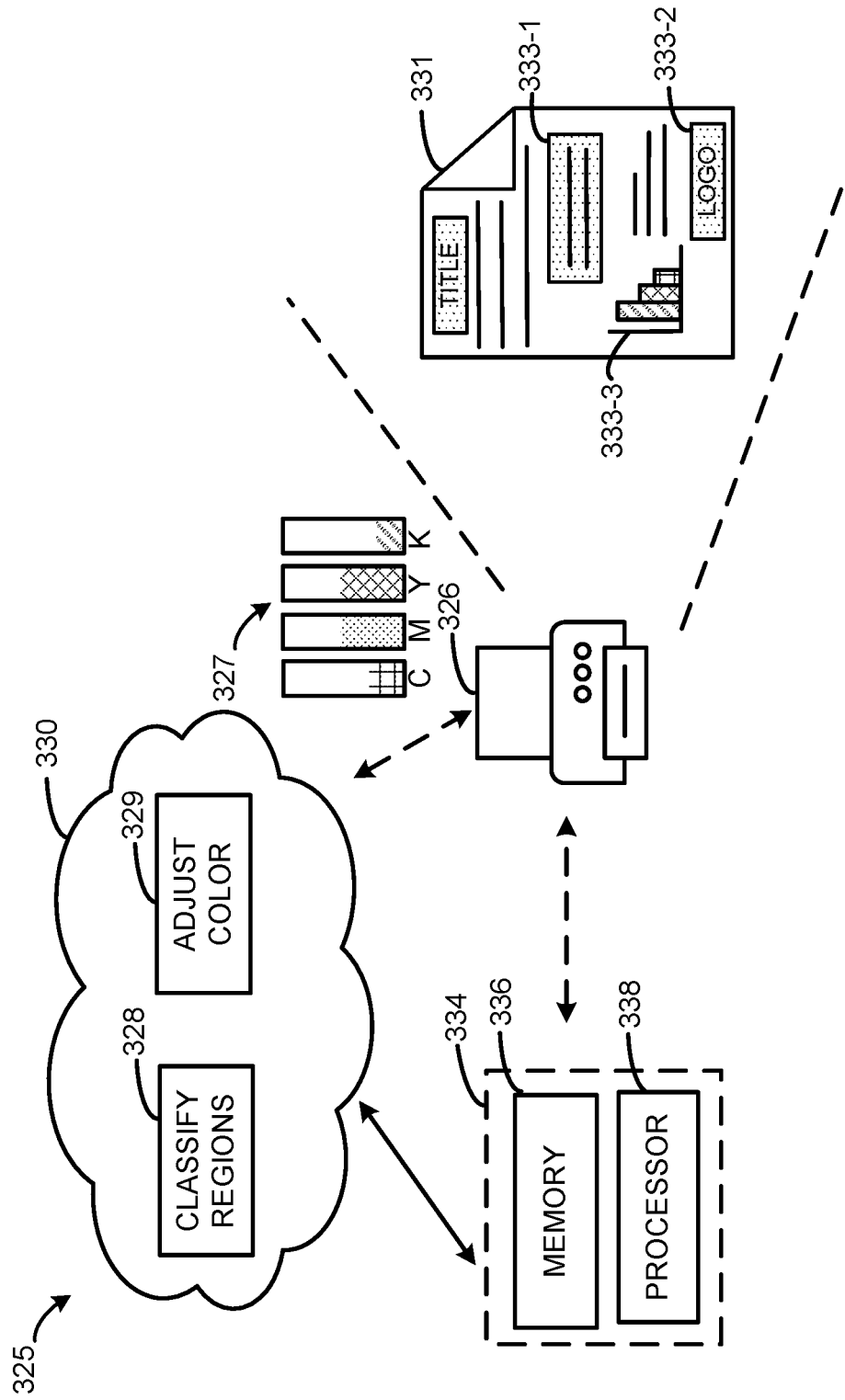
FIG. 3 illustrates an example system for adjusting a color of a subset of a plurality of regions of a print job based on a plurality of supply levels, in accordance with examples of the present disclosure.

FIG. 3 illustrates an example system for adjusting a color of a subset of a plurality of regions of a print job based on a plurality of supply levels, in accordance with examples of the present disclosure.

The system 325 includes a memory 336 and a processor 338. In some examples, the memory 336 and processor 338 may form part of a computing device 334. The computing device 334 may be local to the print device 326 or may include the print device 326 itself. In other examples, the computing device 334 is remote from the print device 326. The computing device 334 and print device 326 may communicate between one another and with other devices using data communications over the network 330.

The memory 336 may store a plurality of supply levels 327 corresponding to a plurality of print supplies of a print device 326. The plurality of print supplies may be attached to the print device 326, such as being inserted into or installed. In some examples, the supply levels 327 may be tracked over supply lifetimes of the print supplies. In some examples, such as with cloud computing, the memory 336 stores a plurality of supply levels corresponding to a plurality of print supplies of a plurality of print devices. The stored data may be used to identify patterns of usage of print supplies of the print device 326, of users of the print device 326, and/or patterns of usage across a plurality of print devices of the system 325.

The processor 338 may track consumption rates of the plurality of print supplies based on the plurality of supply levels 327, classify a subset of a plurality of regions of a print job as adjustable regions, at 328, and adjust a color of the subset of the plurality of regions based on the consumption rates of the plurality of print supplies and the classifications, at 329. The processor 338 may initiate execution of a print job using the adjusted colors for the subset of the plurality of regions and original colors for remaining regions of the plurality of regions. In some examples, the subset of regions includes one region, and in other examples, includes multiple regions of the print job. In some examples, the processor 338 may further classify a second subset of the plurality of regions of the print job as nonadjustable regions. The second subset may include the remaining regions of the plurality of regions or a portion of the remaining regions of the plurality of regions. In some examples, regions which are not classified may default to being classified as nonadjustable regions or otherwise are printed with original colors. As previously described, respective regions in the print job may be classified by defining objects in the plurality of regions using a data model, a set of rules, and/or are otherwise tagged or labelled. The colors may be adjusted based on the set of rules and/or the data model. In some examples, the set of rules are associated with or form part of the data model.

In some examples, the system 325 includes a plurality of distributed computing devices used to provide a print service. The plurality of distributed computing devices may include servers and/or databases that form part of a cloud computing system. The memory 336 and processor 338 may form part of the plurality of distributed computing devices to provide a print service. In some examples, one of the plurality of distributed computing devices may include the memory 336 and the processor 338. In other examples, the memory 336 may form part of a first distributed computing device and the processor 338 may form part of a second distributed computing device of the plurality.

The example system 325 may communicatively connect the plurality of distributed computing devices to a plurality of external devices over the network 330. The plurality of external devices may include a plurality of print devices including the print device 326 and/or a plurality of end-user computing devices including the computing device 334. Example end-user computing devices include desktop computers, laptops, tablets, and smartphones. In some examples in which the memory 336 and processor 338 form part of the plurality of distributed computing devices to provide the print service, the processor 338 may define objects in the plurality of regions using a data model, classify the subset of the plurality of regions and adjust the colors for the subset of the plurality of regions based on the defined objects and a set of rules associated with the data model, at 328 and 329, and instruct the print device 326 to initiate execution of the print job using the adjusted colors for the subset of the plurality of regions and original colors for remaining regions of the plurality of regions.

However, examples are not so limited. In some examples, the memory 336 and processor 338 form part of the print device 326. The processor 338 may classify the subset of the plurality of regions and adjust the colors for the subset of the plurality of regions based on a set of rules, and execute the print job using the adjusted colors for the subset of the plurality of regions and original colors for remaining regions of the plurality of regions.

In some examples, the memory 336 and processor 338 form part of the computing device 334. The processor 338 may define objects in the plurality of regions using a data model, classify the subset of the plurality of regions and adjust the colors for the subset of the plurality of regions based on the defined objects and a set of rules associated with the data model, at 328 and 329, and instruct the print device 326 to initiate execution of the print job using the adjusted colors for the subset of the plurality of regions and original colors for remaining regions of the plurality of regions. In some examples, the computing device 334 may be in communication with the distributed computing devices and the data model may be obtained from the cloud computing system over the network 330.

In the various examples, the print device 326 may execute the print job to generate a printed document 331. The printed document 331 may include different regions 333-1, 333-2, 333-3 which exhibit original colors of the print job and exhibit adjusted colors from the original colors. Documents and/or regions of documents may include objects that may benefit from replicating the original color for understanding and/or for aesthetics purposes, and other documents and/or regions may include objects where colors are useful to provide distinctions and/or the original color may not be needed for understanding and/or for aesthetics. Example objects and/or whole documents that may benefit from reproduction of the original color include humans, animals, nature, logos of organization, trademarks, copyrights, photographs, graphic design documents, among others. Example objects and/or whole documents that may have adjusted colors include graphs, charts, and regions with accent or background colors, among others. AI or ML may be used to analyze the print job and objects within the print job to classify the regions or the whole document as being adjustable and/or nonadjustable.

The nonadjustable regions may be color matched to the original colors of the print job, whereas the nonadjustable regions may have a color adjusted to balance variances in supply levels and/or consumption rates of the plurality of print supplies. As an example, in response to the print device 326 having a C print supply with less supply or fill than M and Y print supplies, the color may be shifted to conserve C print supply. For example, an original green color may be achieved by using 38 percent C print supply, zero percent M print supply, 39 percent Y print supply, and 28 percent K print supply. An adjusted green color may be achieved using 25 percent C print supply, zero percent M print supply, 33 percent Y print supply, and 32 percent K print supply. Balancing variances may coordinate the depletion of the plurality of print supplies, which may maximize use of cartridges, plastics and other single use material for the print supplies and/or for a print material container carrying multiple different print supplies and/or allow for replacement of multiple print supplies at a time.

Figure 4A:
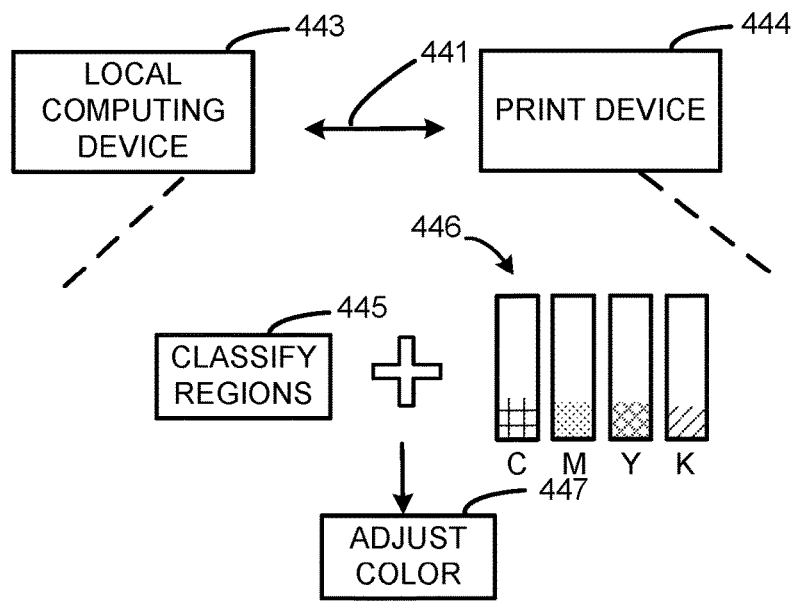
FIGS. 4A-4C illustrate example systems for adjusting a color for a region of a print job based on a plurality of supply levels, in accordance with examples of the present disclosure.
Figure 4B:
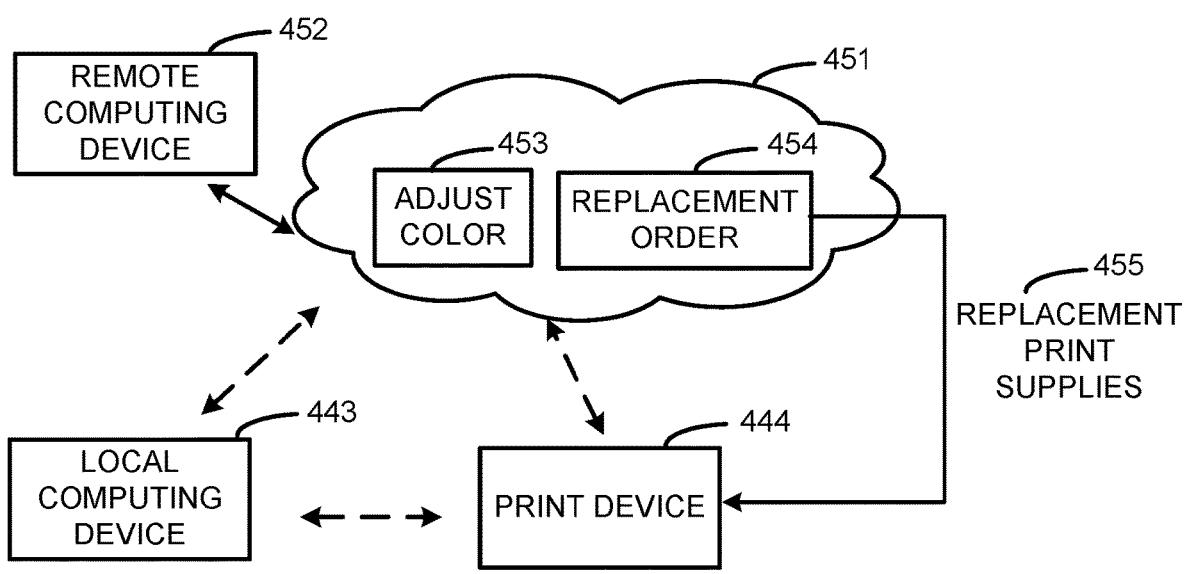
Figure 4C:
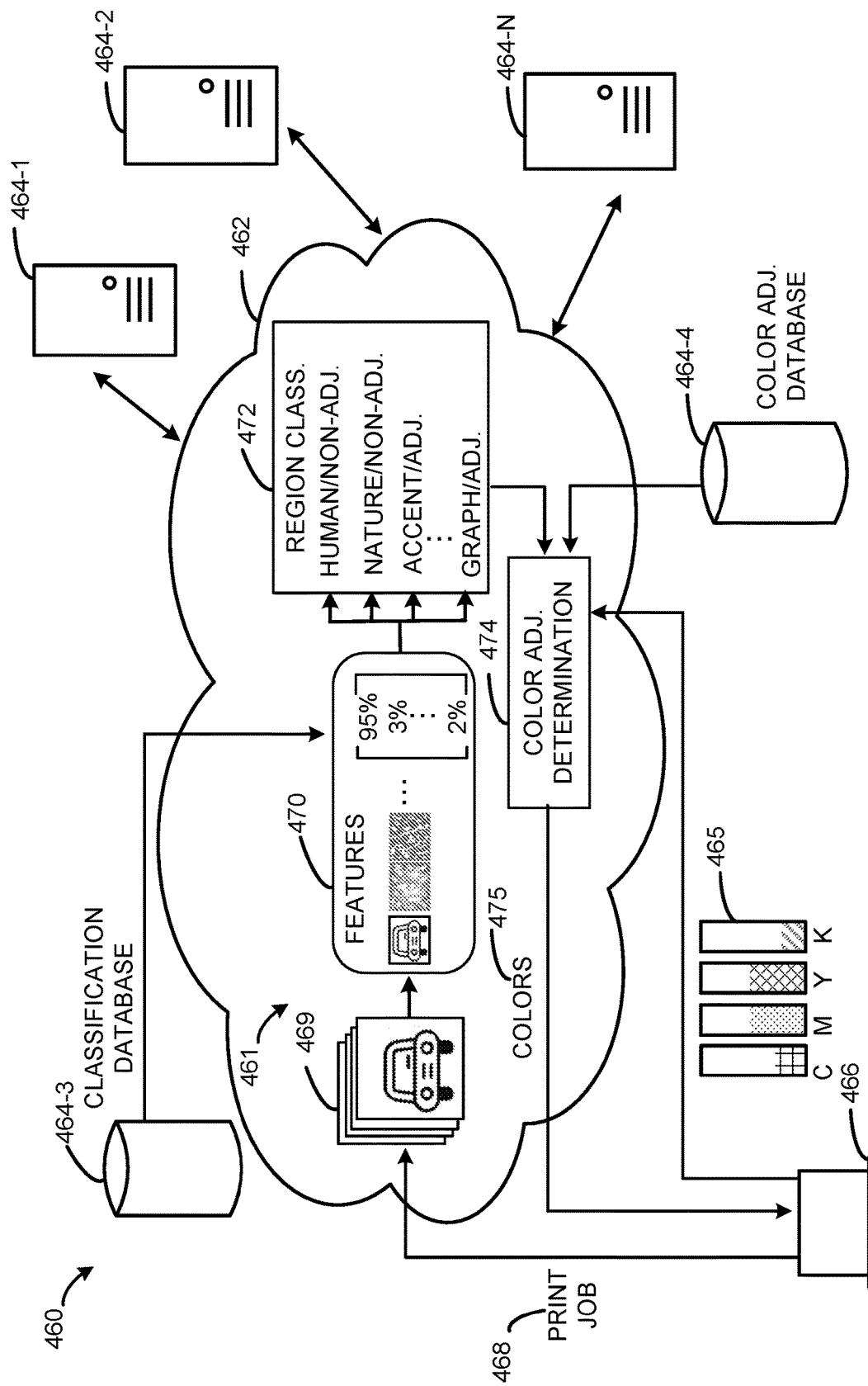

FIGS. 4A-4C illustrate example systems for adjusting a color for a region of a print job based on a plurality of supply levels, in accordance with examples of the present disclosure.

FIG. 4A illustrates an example system that includes a print device 444 and a local computing device 443 that instructs the print device 444 to execute a print job using a network communication 441. In some examples, the print device 444 may include the device 210 of FIG. 2 and/or may implement the method 100 illustrated by FIG. 1 to identify a plurality of supply levels 446 of a plurality of print supplies, e.g., CMYK, classify regions of the print job, at 445, and adjust a color of a region based on the classifications 445 and supply levels 446, at 447. In other examples, the local computing device 443 may include the device 210 of FIG. 2 and/or may implement the method 100 illustrated by FIG. 1 to identify the plurality of supply levels 446, classify regions of the print job, at 445, and adjust a color of a region based on the classifications 445 and supply levels 446, at 447. The adjustment in color to the region(s) may coordinate depletion of the plurality of print supplies, such as reducing variances in supply levels between multiple print supplies. In the particular example, each of the plurality of print supplies have a similar supply level and may be replaced in a single replacement order. However, examples are not so limited, and the coordinated depletion may include two print supplies or three print supplies.

FIG. 4B illustrates an example system that includes a print device 444, a local computing device 443, and a remote computing device 452 which forms part of a cloud computing system 451 or other type of system.

In some examples, the local computing device 443 may include a local server in communication with and/or controlled by the cloud computing system 451. For example, the remote computing device 452 may provide instructions to the local computing device 443, which may classify the regions and/or adjust a color of a region of the print job at 453. The instruction may include the data model or set of rules, such that the local computing device 443 may classify regions and/or adjust colors locally. The local computing device 443 may receive the request for the print job from the print device 444 or another computing device, classify region(s) and/or adjust the color of the region(s), and instruct the print device 444 to execute the print job based on the adjustment(s). In other examples, the remote computing device 452 or the local computing device 443 may provide instructions to the print device 444, such that the print device 444 may determine the adjustment.

In some examples, the remote computing device 452 may drive the classification of regions and/or adjustment of colors of regions of print jobs. The local computing device 443 may communicate data indicative of a print job to the remote computing device 452 or to the print device 444 which communicates with the remote computing device 452. In response to the communication, the remote computing device 452 classifies regions in the print job and adjusts colors in select regions based on the classifications, and instructs the print device 444 to execute the print job based on the adjustments, either directly or through the local computing device 443.

Some examples may include a combination of remote and local processing. For example, the remote computing device 452 may use a data model to determine a set of rules or may train the data model to provide to the local computing device 443 or the print device 444. The local computing device 443 or the print device 444 may locally classify regions and adjust colors for the classified regions using the set of rules and/or the trained data model. The remote computing device 452 may send updated rules based on revisions to the data model or provide a revised trained data model, among other revisions.

In various examples, the remote computing device 452, local computing device 443, or print device 444 may initiate a replacement order 454 for the print supplies. The replacement order 454 may be initiated in response to threshold supply levels, predicted supply lifetimes, and/or based on shipping or services times, among other data. In some examples, initiation of the replacement order 454 may cause shipment of replacement print supplies 455.

FIG. 4C illustrates an example system 460 that includes a print device 466 and a plurality of distributed computing devices 464-1, 464-2, 464-3, 464-N, herein generally referred to as "the distributed computing devices 464".

As previously described, the distributed computing devices 464 may be used to provide a print service 461, such as a print supply replacement service or a managed print service. The distributed computing devices 464 may include servers 464-1, 464-2, 464-N and/or databases 464-3, 464-4 that form part of a cloud computing system 462.

The above-described region classification and color adjustment may be performed by the cloud computing system 462. For example, the print device 466 may communicate the plurality of supply levels 465 of the print supplies installed in the print device 466 and may communicate the print job 468 (e.g., image data) to the print service 461 of the cloud computing system 462. The print service 461 may receive a plurality of print job images 469, including the print job 468, and may use a MLM to classify features in the print job 468, at 470. As an example, the MLM may include a CNN that uses a classification dataset to detect objects in the print job 468. The classification dataset may be stored on a first database 464-3 of the cloud computing system 462.

Based on the detected objects in the print job 468, at 472, the print service 461 classifies regions of the print job 468. For example, the MLM may be associated with a set of rules that identifies which objects may have adjusted colors and which objects may not (e.g., replicate the original colors). As shown at 472 in FIG. 4C, colors of human and nature objects may not be adjusted, whereas colors of accent and graph objects may be adjusted. The classification of regions may include identifying the location of the objects in the print job and classifying each region associated with an object as an adjustable region and/or a nonadjustable region, as previously described. The set of rules may be stored on a second database 464-4 of the cloud computing system 462 and/or may form part of the MLM.

Based on the classifications, at 474, the print service 461 may adjust color(s) for the adjustable regions based on color adjustment options, the supply levels 465, and/or consumption rates of the print supplies. In some examples, the color adjustment options may form part of the set of rules and/or be stored on the second database 464-4 of the cloud computing system 462 and used as input to the color adjustment determination, at 474. In response to the color determination, the print service 461 communicates colors 475 to print for the print job to the print device 466 and the print device 466 executes the print job.

Figure 5:
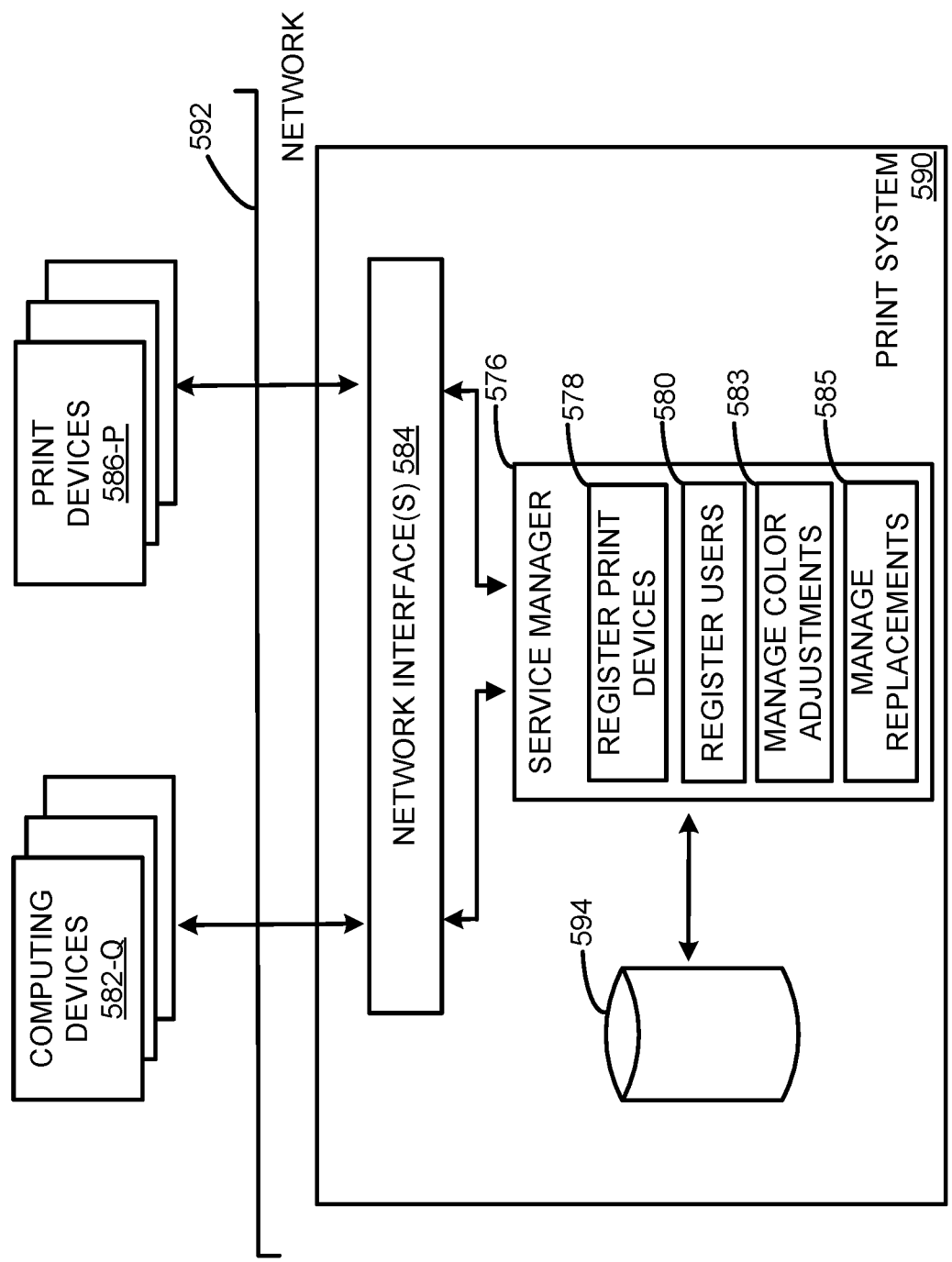
FIG. 5 illustrates an example print system for consumption-based color adjustment, in accordance with examples of the present disclosure.

FIG. 5 illustrates an example print system for print supply management, in accordance with examples of the present disclosure. The print system 590 may provide a registration process for print devices, and may manage replacement orders for print supplies. The print system 590 may be implemented by a remote service provider. The print system 590 may be used to provide a portal to receive data as part of a registration process from print devices 586-P and/or computing devices 582-Q and includes a service manager 576 to manage services for registered users.

The components of the print system 590 may be implemented using computer-readable instructions and/or on a computing device, such as a server, a laptop, a computing device, or on a plurality of distributed computing devices including distributed processor and memory resources that may communicate with one another and with other devices over the network 592. The computing device may operate to execute computer-readable instructions, such as described above, to perform the processes described herein and related to the various components of the print system 590. The print system 590 may be cloud-based, for example, and/or may be implemented through other computer systems in alternative architectures, such as a peer-to-peer network.

The print system 590 may communicate with computing devices 582-Q and print devices 586-P over the network 592 using a network interface 584. In some examples, the print system 590 includes a plurality of network interfaces for communicating over a plurality of networks, such as wireless and wired networks. In some examples, the print system 590 communicates with the computing devices 582-Q via the network interface 584 and a portal or an application programming interface (API).

The print system 590 includes a service manager 576 that manages a plurality of services for users registered with the print system 590. The service manager 576 may provide a registration process in which a user registers the user or an associated organization with a print service, at 580, and may register print devices 586-P to be accessible as user defined, at 576. The service manager 576 stores the data for registration in memory, such as in a database 594. Although a database 594 is illustrated, example print systems 590 include a plurality of databases stored on memory resources and which are accessible by a plurality of distributed processors implementing the service manager 576.

In some examples, the registration process may include execution of a service agreement with the service provider. The service agreement may set out terms and parameters for providing the particular print service for the account. For example, the service agreement may specify a cost to print a page using particular type of print. The cost may be calculated based on parameters of the print job. Parameters of the print job may include a type of print supply, including type of ink or toner and media, and a print mode.

The service manager 576 monitors use of the printing services across the print devices 586-P. For example, the service manager 576 may monitor print supplies of the plurality of print devices 586-P, manage color adjustments 583, and/or manage replacement orders 585. Managing the color adjustments 583 may include performing object detection for classifying regions of print jobs, and color adjustment determination for respective regions for the print devices 586-P based on tracked supply levels and classifications, such as previously described. The color adjustment may be controlled remotely by the service manager 576 or locally by the print devices 586-P and/or the computing devices 582-Q using a set of rules and/or a trained data model. By adjusting colors of regions of print jobs, supply lifetimes may be extended and the plurality of print supplies for respective print devices may be depleted in a coordinated manner to allow for reduced costs to the service provider for replacing the print supplies across the print system 590. The service manager 576 may manage the replacement orders 585 to balance cost to the service provider and the customer. In some examples, the replacement print supplies are ordered by the service manager 576, such as by initiating an order for multiple print supplies from a supply source. The replacement print supplies may be shipped from the supply source to a location of the print device for installation. In other examples, the replacement print supplies are ordered by the service manager 576 scheduling an appointment with an employee of the service provider. The employee may travel to the location of the print device and install the replacement plurality of print supplies.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
identifying a plurality of supply levels corresponding to a plurality of print supplies of a print device;
classifying a region of a print job;
adjusting a color for the region of the print job for the print device based on the plurality of supply levels and the classification of the region; and
initiating execution of the print job using the adjusted color for the region.

2. The method of claim 1, further including:
identifying consumption rates of the plurality of print supplies based on the plurality of supply levels; and
adjusting the color for the region by shifting a mixture of the plurality of print supplies to use for the region to reduce use of a print supply of the plurality of print supplies based on the consumption rates.

3. The method of claim 1, wherein adjusting the color for the region includes shifting a mixture of the plurality of print supplies for the region to reduce use of a first subset of the plurality of print supplies and to increase use of a second subset of the plurality of print supplies as compared to printing an original color for the region of the print job.

4. The method of claim 1, further including adjusting the color for the region based on a set of rules associated with:
classifications of a plurality of regions to adjust an original color and to match the original color, variances in consumption rates of the plurality of print supplies, color adjustment options, and color adjustment mixtures.

5. The method of claim 1, further including applying a data model to input data to classify the region and adjust the color for the region.

6. The method of claim 5, wherein the data model includes a machine learning model (MLM) and the method further includes:
classifying a plurality of regions of the print job by defining a plurality of objects in the print job using the data model, wherein the plurality of regions include the region and are classified as adjustable regions and nonadjustable regions based on the defined plurality of objects;
determining to adjust the color of the region based on the classifications and a set of rules; and
in response to the determination, adjusting the color for the region based on the set of rules.

7. The method of claim 1, wherein adjusting the color for the region includes coordinating depletion of the plurality of print supplies by reducing variances in supply lifetimes of the print supplies.

8. The method of claim 1, further comprising:
defining an object in the region using a data model; and
classifying the region and adjusting the color for the region based on the defined object and a set of rules associated with the data model.

9. The method of claim 1, wherein the region is classified as an as adjustable region based on an object in the region.

10. A non-transitory computer-readable storage medium comprising instructions that when executed cause a processor to:
identify consumption rates of a plurality of print supplies of a print device based on a plurality of supply levels corresponding to the plurality of print supplies;
classify a region of a plurality of regions of a print job;
adjust a color for the region based on the consumption rates and the classification; and
initiate execution of the print job using the adjusted color for the region.

11. The non-transitory computer-readable storage medium of claim 10, further including instructions that when executed, cause the processor to classify the plurality of regions and adjust the color for the region based on a data model and input data, the input data being selected from:
the plurality of supply levels, the consumption rates, patterns of usage of the plurality of print supplies, the print job, and a combination thereof.

12. The non-transitory computer-readable storage medium of claim 10, further including instructions that when executed, cause the processor to classify the plurality of regions based on a plurality of defined objects in the print job and a data model.

13. The non-transitory computer-readable storage medium of claim 10, further including instructions that when executed, cause the processor to adjust the color for the region based on a set of rules to coordinate depletion of the plurality of print supplies, the set of rules being associated with classifications of the plurality of regions to adjust and color adjustment options.

14. The non-transitory computer-readable storage medium of claim 10, further including instructions that when executed, cause the processor to:
track patterns of usage of the print device including the consumption rates;
based on the track patterns, predict supply lifetimes of the plurality of print supplies; and
initiate a replacement order for the plurality of print supplies based on the predict supply lifetimes.

15. The non-transitory computer-readable storage medium of claim 10, further including instructions that when executed, cause the processor to:
- aggregate data associated with patterns of usage of print supplies of a plurality of print devices including the print device; and
- based on the aggregated data, track patterns of usage of print supplies for the plurality of print device and predict depletion or consumption rates of the print supplies based on the tracked patterns of usage of at least the print device.

16. A system comprising:
- a memory to store a plurality of supply levels corresponding to a plurality of print supplies of a print device;
- a processor to:
  - track consumption rates of the plurality of print supplies based on the plurality of supply levels;
  - classify a subset of a plurality of regions of a print job as adjustable regions;
  - adjust a color of the subset of the plurality of regions based on the consumption rates of the plurality of print supplies; and
  - initiate execution of the print job using the adjusted colors for the subset of the plurality of regions and original colors for remaining regions of the plurality of regions.

17. The system of claim 16, wherein the memory and processor form part of a computing device and the processor is to:
- define objects in the plurality of regions using a data model;
- classify the subset of the plurality of regions and adjust the colors for the subset of the plurality of regions based on the defined objects and a set of rules associated with the data model; and
- instruct the print device to initiate the execution of the print job using the adjusted colors for the subset of the plurality of regions and the original colors for the remaining regions of the plurality of regions.

18. The system of claim 16, wherein the memory and processor form part of a plurality of distributed computing devices to provide a print service, and the processor is further to:
- define objects in the plurality of regions using a data model;
- classify the subset of the plurality of regions and adjust the colors for the subset of the plurality of regions based on the defined objects and a set of rules associated with the data model; and
- instruct the print device to initiate the execution of the print job using the adjusted colors for the subset of the plurality of regions and the original colors for the remaining regions of the plurality of regions.

19. The system of claim 16, wherein the memory and processor form part of the print device, and the processor is to:
- classify the subset of the plurality of regions and adjust the colors for the subset of the plurality of regions based on a set of rules; and
- execute the print job using the adjusted colors for the subset of the plurality of regions and the original colors for the remaining regions of the plurality of regions.

20. The system of claim 16, wherein the processor is to initiate a replacement order for the print supplies based on the plurality of supply levels.

* * * * *